Nov. 21, 1944. R. ROSEN 2,363,264
ALKYLATION CATALYST
Filed July 2, 1941
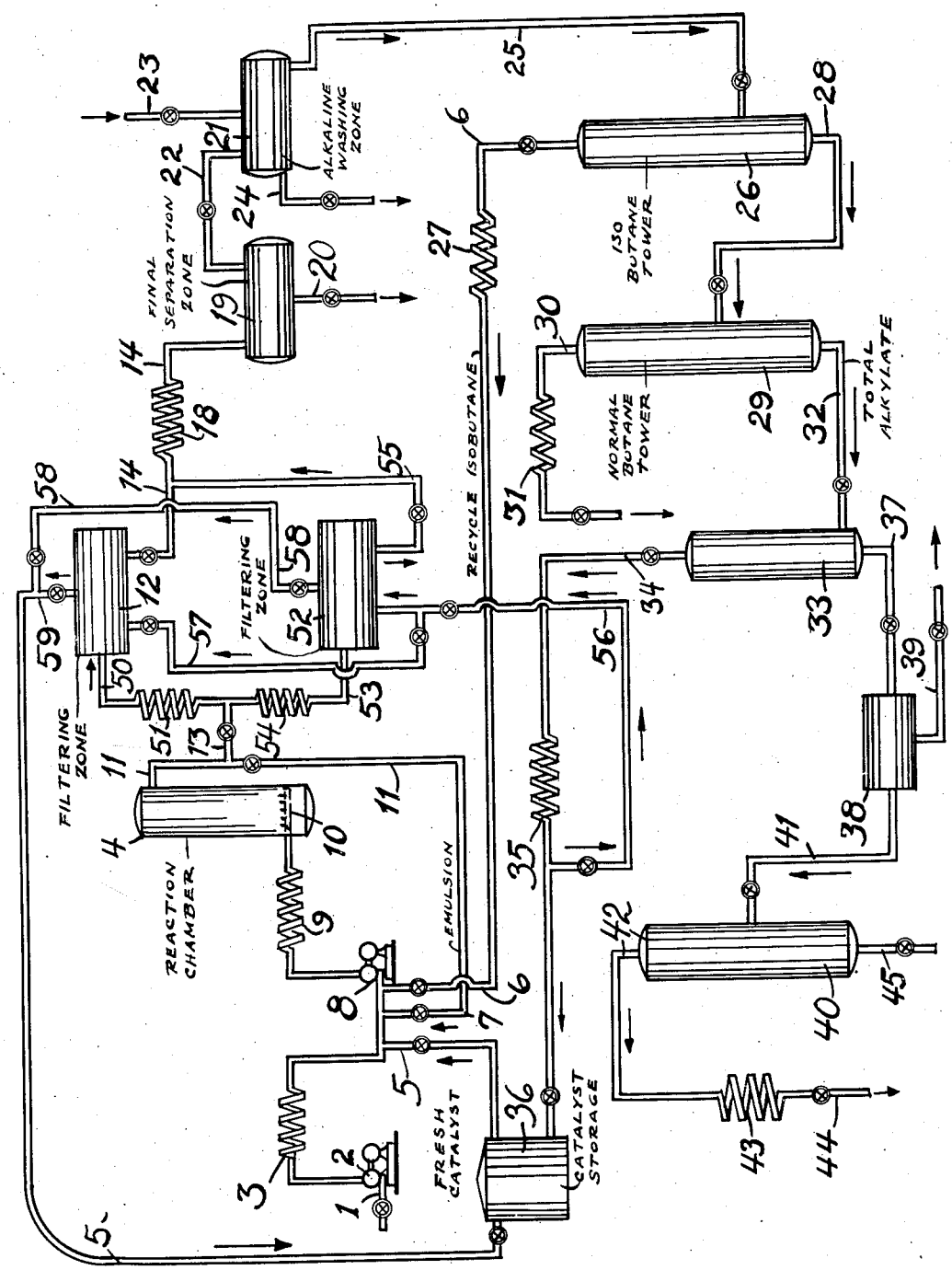
Raphael Rosen Inventor
By ___ Young Attorney Patented Nov. 21, 1944

2,363,264

UNITED STATES PATENT OFFICE 2,363,264

ALKYLATION CATALYST

Raphael Rosen, Elizabeth, N. J., assignor to Standard Oil Development Company, a corporation of Delaware Application July 2, 1941, Serial No. 400,733

9 Claims. (Cl. 260—683.4)

The present invention is concerned with the production of normally liquid saturated hydrocarbons suitable for use as motor fuels. The invention more particularly relates to a method for alkylating saturated hydrocarbons containing at least one tertiary carbon atom per molecule with olefins, utilizing an aluminum chloride catalyst. In accordance with the process of the present invention, isoparaffins containing a tertiary carbon atom are alkylated with olefins utilizing an aluminum chloride catalyst dissolved in a suitable solvent.

It is known in the art that saturated hydrocarbons containing a tertiary carbon atom, hereinafter referred to as tertiary hydrocarbons, will react with olefins, in the presence of a suitable catalyst, resulting in the production of a wide range of higher boiling hydrocarbon products. The nature of these reactions varies widely with the reaction conditions and with the particular type and character of feed materials employed. The feed stocks which are employed in reactions of this character vary considerably. The isoparaffinic constituent of the feed stock usually comprises isobutane, isopentane, and similar higher branched chain homologues containing at least one tertiary carbon atom per molecule. The olefinic reactants generally comprise propylene, normal butylenes, isobutylene, trimethyl ethylene, the isomeric pentenes, and similar higher mono-olefinic hydrocarbons of either a straight chain or branched chain structure. Mixtures of two or more of these mono-olefins are likewise employed. In certain operations, the feed material comprises refinery cuts segregated from various cracking and distillation operations, such as propane, butane, and pentane cuts which comprise constituents boiling in the respective boiling ranges. Other feed materials comprise polymers, copolymers, interpolymers, and cross-polymers of the above-mentioned olefins as, for example, diisobutylene, triisobutylene, tetraisobutylene, the codimer, cotrimer and cotetramer of normal butylenes and isobutylene.

In these reactions the catalyst generally employed comprises a concentrated mineral acid as, for example, a sulfuric acid, a halogenated sulfuric acid, an acid of phosphorus, or an equivalent acid, the acid concentration of which is above about 80%, preferably in the range from about 90% to about 95%.

It has been suggested that instead of employing a mineral acid, other catalysts as, for example, aluminum chloride be utilized. However, an operation of this character employing aluminum chloride as a catalyst has not been entirely satisfactory due to the relatively short life of the aluminum chloride catalyst. This is due in part to the fact that the aluminum chloride is coated during the reaction with sludge which materially lowers its efficiency. I have, however, now discovered an operation by which aluminum chloride may be readily and efficiently employed in the alkylating process. In accordance with my process, the acid-active metal halides are dissolved in an unreactive polar solvent as, for example, aluminum chloride, in combination as a complex with an organic oxy-compound possessing a dipole moment, such as the organic nitro compounds of which the nitroparaffins, the nitro-aralkyl compounds, and the nitro-isocyclic compounds such as nitro-benzene, nitro-cyclohexane, and the like, and their homologues and substitution products. Other desirable solvents are selected from the class of halogenated low molecular weight hydrocarbons and carbon disulfide. A particularly desirable solvent comprises ethyl chloride. The process of my invention may be readily understood by reference to the attached drawing illustrating one embodiment of the same.

Referring specifically to the drawing, it is assumed for the purpose of illustration that the feed comprises a refinery butane cut comprising butane, isobutane, isobutylene, alpha butylene, and beta butylene. The feed is introduced into the system by means of feed line 1 and pump 2, and passed through heat exchanging zone 3 wherein the temperature of the feed may be adjusted to the desired degree. The feed is then combined with fresh catalyst, with recycled catalyst hydrocarbon emulsion, and with recycled isobutane, which latter streams are produced as hereinafter described. The fresh catalyst is introduced by means of catalyst feed line 5, the recycled isobutane introduced by means of line 6, and the recycled catalyst hydrocarbon emulsion by means of line 7. For the purpose of description, it is assumed that the fresh catalyst comprises a 4% to 5% solution of aluminum chloride dissolved in ethyl chloride which is saturated with hydrochloric acid. The mixture is passed by means of pump 8 through cooling zone 9 and introduced into reaction zone 4 by suitable jets or equivalent dispersing means 10. Turbo mixers, orifice mixers, or mechanical agitators may be employed. Cooling zone 9 preferably comprises a propane cooler or other equivalent means which is regulated to control the temperature of the mixture entering reaction zone 4. Usually the temperature of the mixture entering reaction zone 4 is in the range from about 15° F. to about 75° F., preferably at a temperature in the range from about 50° F. to about 60° F.

The reaction mixture flows upwardly through reaction zone 4 which may contain suitable dispersing and distributing means as, for example, pierced plates, baffle plate arrangements, pack masses, or other equivalent means. Conditions are adjusted so as to secure the desired reaction time in reaction zone 4. The reaction mixture is withdrawn from reaction zone 4 by means of line 11 and segregated into two streams, one stream of which is recycled to the reaction zone by means of line 7 while the other stream is passed to initial separation zone 12, which is taken to be a filtering zone, by means of lines 13 and 50. The manner in which the stream withdrawn from reaction zone 4 is segregated may vary considerably. However, for the purpose of description it is assumed that approximately 25% to 40% of the stream removed from reaction zone 4 is passed into initial separation zone 12. Filtering zone 12 serves to remove the aluminum chloride. In general, it is preferred to cool the stream in cooling zone 51 before introducing it into zone 12. At the end of a period after filtering zone 12 has removed an amount of aluminum chloride, the stream removed by means of line 13 is passed into a second filtering zone 52 by means of line 53. It is similarly preferred to cool the stream introduced into zone 52 by means of cooler 54. The aluminum chloride removed in filtering zone 12 is removed from said zone in a manner as hereinafter described. At the end of a cycle, the feed oil is again introduced into zone 12 and aluminum chloride removed from zone 52 in a similar manner as hereinafter described.

The hydrocarbon phase comprising normal butane, isobutane, and total alkylate withdrawn from filtering zone 12 by means of line 14 and from filtering zone 52 by means of line 55 is passed through heat exchanging zone 18 and introduced into a final separation zone 19 wherein any entrained catalyst may be separated and removed by means of line 20. The hydrocarbon layer is passed into alkaline washing zone 21 by means of line 22 wherein the same is contacted with a suitable alkaline reagent which is introduced by means of line 23 and withdrawn by means of line 24. For the purpose of description it is assumed that the alkaline reagent comprises a sodium hydroxide solution. The soda treated hydrocarbon phase is withdrawn from treating zone 21 by means of line 25 and introduced into an initial distillation zone 26, which for the purpose of description is termed an isobutane tower. Temperature and pressure conditions are adjusted in zone 26 to remove isobutane overhead by means of line 6, which stream is condensed in condensing zone 27 and recycled with the feed to reaction zone 4 as hereinbefore described. The bottoms stream withdrawn from zone 26 by means of line 28 comprising normal butane and total alkylate is introduced into a secondary distillation zone 29, which for the purpose of description is termed a normal butane tower. Temperature and pressure conditions are adjusted to remove normal butane overhead by means of line 30, which stream is condensed in condensing zone 31 and further refined or handled as desired. In general, this stream is passed to motor fuel blending. The bottoms from secondary distillation zone 29 withdrawn by means of line 32 comprising the total alkylate is passed to a solvent recovery zone 33 operated under temperature and pressure conditions adapted to remove overhead the ethyl chloride by means of line 34. The ethyl chloride may be passed through condensing zone 35 and returned to catalyst storage 36 from where it may be recycled by means of line 5. However, in general it is preferred to pass at least a portion of the condensed ethyl chloride into the respective filtering zones 12 and 52 by means of lines 56 and 57. By operating in this manner, the aluminum chloride in the respective filtering zones is dissolved and removed by means of the ethyl chloride. The ethyl chloride containing dissolved therein the aluminum chloride is removed from filtering zone 52 by means of line 58, from zone 12 by means of line 59, and passed to storage zone 36. The bottoms comprising the total alkylate free of ethyl chloride is removed by means of line 37 and passed through filtering zone 38 wherein any remaining aluminum chloride is separated and removed by means of line 39 and removed from the system. The total alkylate free of ethyl chloride and aluminum chloride is passed to final distillation zone 40 by means of line 41 wherein the same is fractionated to secure the desired product. Temperature and pressure conditions are adjusted in zone 40 to remove overhead by means of line 42 a hydrocarbon product having a final boiling point of about 290° F. to 300° F., and a C. F. R. octane number in the range from about 90 to about 95. This overhead stream is condensed is condensing zone 43 and withdrawn from the system by means of line 44. The bottoms product withdrawn by means of line 45 comprises a fuel boiling in the range from about 320° F. to about 500° F. and has a C. F. R. octane number in the range from about 75 to about 85. This material is further refined or handled in any manner desired.

The process of the present invention may be widely varied. The invention essentially comprises conducting the reaction by employing an aluminum chloride catalyst dissolved in a suitable solvent. It is to be understood that a solvent mixture may be employed. For example, I have found that particularly desirable results are secured providing the solvent be saturated with hydrogen chloride. It is also to be understood that the respective zones may comprise any suitable number and arrangement of units. Although a wide range of operating temperatures may be employed, the reaction is usually conducted at a relatively low temperature, that is, of about 30° F. to about 100° F., preferably between about 40° F. and about 70° F.

The time of the reaction varies considerably but in general is in the range from about 5 minutes to about 2½ hours, or longer, depending upon related operating conditions. Usually the reaction time is in the range from about 10 to about 60 minutes.

The reaction may be carried out in the vapor phase, but is generally conducted in the liquid phase. In a liquid phase operation the pressures are at least sufficient to keep the respective reactants from vaporizing and are usually in the range from about 0 to about 12 atmospheres, although pressures as high as 100 atmospheres may be employed depending upon the reaction temperature.

Equal molecular quantities of the isoparaffin and mono-olefin may be used. However, it has been found that it is desirable to maintain a substantial excess of the tertiary hydrocarbon in the reaction zone and to operate in a reaction medium containing an excess of the catalyst composition. For example, in an operation wherein isobutane or isopentane is employed as the isoparaffinic reactant, the mol ratio ranges from about 1 to as high as 30 mols and higher of isoparaffin per mol of mono-olefins present.

Although various solvents may be used, such as chlorinated low molecular weight hydrocarbons, carbon disulfide, and nitro-methane, I have found that it is preferable to use ethyl chloride. Furthermore, it is desirable to saturate the ethyl chloride with aluminum chloride to the extent of from about 50% to 75% saturation. It is also desirable that this ethyl chloride either be moist or that it contain hydrochloric acid gas. The latter is introduced preferably until the ethyl chloride is saturated therewith.

The amount of solvent employed will vary considerably and will depend upon the amount of aluminum chloride dissolved therein. For example, when utilizing ethyl chloride as a solvent, I prefer to use from 0.1 to 10 volumes of solvent per volume of reactant. As pointed out heretofore, it is desirable that the ethyl chloride be from about 50% to 75% saturated with aluminum chloride. At about 30° F. to 40° F. the amount of aluminum chloride dissolved in this concentration will be from 4 to 6 grams aluminum chloride per 100 grams of ethyl chloride.

In order to illustrate the invention further, the following examples are given which should not be construed as limiting the same in any manner whatsoever.

EXAMPLE 1

Isopentane was alkylated with diisobutylene in a 3/1 isoparaffin/olefin mol ratio at 70° F., using as a catalyst aluminum chloride; about 10% by weight of aluminum chloride based on the total hydrocarbon was used. This same catalyst was reused three times with the results given below.

*Alkylation of isopentane with diisobutylene 70° F., 3/1 isoparaffin/olefin mol ratio 2 hours total time*

| Operation | Catalyst | Weight per cent catalyst on total hydrocarbon | Weight per cent yield $C_8+$ on olefin |
| --- | --- | --- | --- |
| A | $AlCl_3$ | 10 | 108 |
| B | do | 10 | 120 |
| C | do | 10 | 132 |
| D | do | 10 | 114 |

Theoretical yield 228% by weight.

EXAMPLE 2

Isopentane was alkylated with diisobutylene in a 3/1 isoparaffin/olefin mol ratio at 70° F. in a series of runs using 6.6, 3.3, and 1.1 weight percent, based on total hydrocarbon of ethyl chloride saturated with aluminum chloride. The feed in these runs was not treated to remove any moisture present. The results are given in the table below (Runs A, B, C).

In order to determine the effect of moisture in the feed which would tend to react with the aluminum chloride to liberate hydrochloric acid, Run "C" was repeated after drying the feed but with all other conditions the same (Run "D"). A marked decrease in yield was noted.

In order to determine further the effect of hydrochloric acid on the yield, Run "D" was repeated under similar conditions except that the catalyst was presaturated with hydrochloric acid before use (Run "E"). The yield was improved above that in Run "D" but was not equal to that obtained when using a moist feed.

[$AlCl_3$—ethyl chloride catalyst]

*Isopentane—dimer reaction*

[70° F., 1 hour, 3/1 isoparaffin/olefin mol ratio, saturated solution of $AlCl_3$ in ethyl chloride]

| Run | Weight per cent $AlCl_3$ on hydrocarbon | Ethyl chloride and feed dried | Weight per cent $C_8+$ on olefin | Weight per cent $C_8$-$C_9$ in $C_8+$ |
| --- | --- | --- | --- | --- |
| A | 6.6 | No | 244 | 59 |
| B | ¹ 3.3 | No | 264 | 59 |
| C | 1.1 | No | 193 | 59 |
| D | 1.1 | Yes | 133 | 43 |
| E | ² 1.1 | Yes | 157 | |

¹ Reaction time—2 hours.
² Catalyst was saturated with HCl.

From the above, it is apparent that appreciable improvement in alkylation yield is secured when utilizing aluminum chloride dissolved in ethyl chloride as a catalyst for the alkylation of commercial isoparaffins with olefins.

What I claim as new and wish to protect by Letters Patent is:

1. Process for alkylating isoparaffins with olefins, which comprises contacting the same in the presence of an aluminum chloride catalyst dissolved in a low molecular weight halogenated hydrocarbon solvent.

2. Process as defined by claim 1, in which said solvent is ethyl chloride.

3. Process for alkylating isoparaffins with olefins, which comprises contacting the same in the presence of an aluminum chloride catalyst dissolved in a low molecular weight halogenated hydrocarbon solvent at a temperature in the range from about 40° F. to 100° F.

4. Process as defined by claim 3, in which said temperature is in the range from about 40° F. to 70° F.

5. Process as defined by claim 3, in which said solvent comprises ethyl chloride.

6. Process for alkylating isoparaffins with olefins, which comprises contacting the same in the presence of a catalyst which comprises ethyl chloride saturated with from about 50% to 75% aluminum chloride.

7. Process as defined by claim 6 in which the reaction is conducted at a temperature in the range from about 40° F. to 70° F.

8. Process for alkylating isoparaffins with olefins which comprises contacting the same in the presence of aluminum chloride catalyst dissolved in a low molecular weight halogenated hydrocarbon solvent which is saturated with hydrogen chloride.

9. Process as defined by claim 8, in which the feed constituents contain a small amount of moisture.

RAPHAEL ROSEN.